United States Patent [19]

De Nichilo

[11] Patent Number: 5,778,145
[45] Date of Patent: Jul. 7, 1998

[54] THERMOFORMING APPARATUS WITH PIVOTABLE HEATING PANEL PORTIONS FOR EMERGENCY MOVING THEREOF

[76] Inventor: Giorgio De Nichilo, Via Aldo Moro, 49, 20066 Melzo (Milano), Italy

[21] Appl. No.: 650,975

[22] Filed: May 21, 1996

[30] Foreign Application Priority Data

Mar. 27, 1996 [IT] Italy ................................ MI96A0607

[51] Int. Cl.[6] ................................ F27B 9/06; F27B 9/36; H05B 3/06
[52] U.S. Cl. .................. 392/416; 392/414; 392/415; 392/412; 219/388; 219/524
[58] Field of Search ........................ 392/411–417; 250/504 R; 425/174.4, DIG. 13, 150, 151; 219/388, 524; 34/266, 273

[56] References Cited

U.S. PATENT DOCUMENTS

| 1,292,335 | 1/1919 | Ledig et al. ........................ 392/412 |
|---|---|---|
| 3,801,246 | 4/1974 | Gustavsson ........................ 425/174.4 |
| 3,922,520 | 11/1975 | Moore ................................ 392/417 |
| 4,015,340 | 4/1977 | Treleven ............................... 34/278 |
| 4,494,316 | 1/1985 | Stephansen et al. ................. 392/417 |

FOREIGN PATENT DOCUMENTS

| 133847 | 3/1985 | European Pat. Off. ............... 392/415 |
|---|---|---|
| 914329 | 10/1964 | France ............................... 392/412 |
| 465960 | 11/1952 | Italy ................................... 392/411 |

*Primary Examiner*—Teresa J. Walberg
*Assistant Examiner*—F. Pelham
*Attorney, Agent, or Firm*—Bucknam and Archer

[57] ABSTRACT

An oven for use be in heating stations of thermoforming apparatus, comprises a heating panel constituted by panel portions which can be mutually opened or separated by a controlled falling operation or by gravity. Thus, in an emergency condition, the panel can be immediately removed from the plastic material being deformed, even in a case of a malfunction of the driving mechanism controlling the operation of the oven.

13 Claims, 8 Drawing Sheets

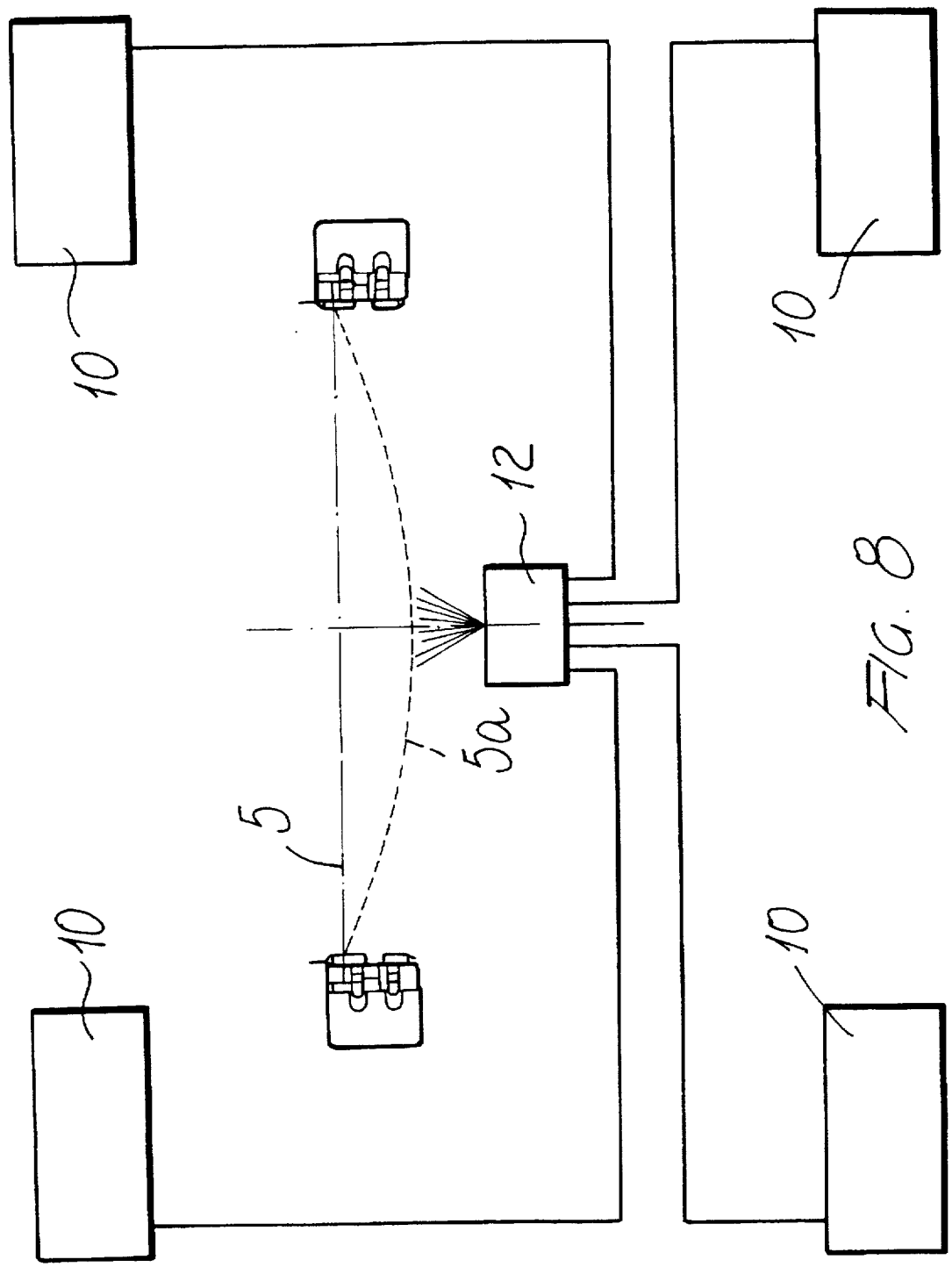

5,778,145

1

THERMOFORMING APPARATUS WITH PIVOTABLE HEATING PANEL PORTIONS FOR EMERGENCY MOVING THEREOF

BACKGROUND OF THE INVENTION

The present invention relates to a new type of oven which is specifically designed for use in heating stations of thermoforming apparatus, and it also relates to a heating station including such an oven.

For making plastic material articles of manufacture (for example cells and counter-doors of domestic refrigerators, panels of car doors, packages, and so on), a continuous plate or sheet of this plastic material is processed in a heating region or station of a thermoforming apparatus. In this region, the material is brought to its plasticizing temperature, at which it is softened so as to assume the shape of the mold, by arranging it at a suspended position between a heating panel or top oven and a bottom heating panel or oven, both provided with heating electrical resistances.

The plasticizing temperature is a critical parameter of the overall thermoforming process. Actually, even slight offsets from the specific plasticizing temperature for the material to be processed, will involve several drawbacks, as follows:

an excessive deflection of the material (the so-called belling deformation), which does not allow to evenly process the material above the mold; and a quick falling of plastic material portions above the heating elements, with a consequent danger of fires.

In order to prevent the latter drawback from occurring, conventional heating stations are provided with means for withdrawing the heating ovens from the plasticizing region, so as to bring the heating elements away from the region wherein a possible material falling could occur.

However, such an approach would require a sufficient time to allow the panels to be withdrawn from the heating region, which time would be not compatible with emergency conditions occurring as the plastic material, because of an excessive deflection produced by possible overheating phenomena, would dangerously approach the bottom panel. Under these conditions, in fact, the removal of the heating elements by conventional methods could not be performed with a sufficient speed to effectively prevent fire dangers. The operation for withdrawing the heating panels toward the rear of the apparatus is also affected by the drawback that this operation requires additional spaces, which practically make the space occupied by the oven excessively great.

To the above mentioned drawbacks, and which relate the safety conditions of the thermoforming processor the presently known systems also add the following. In particular, as the plastic material plate or sheet has achieved the plasticizing temperature, it will tend to deflect or to be bell-deformed, by moving away from the surface of the top heating element (which is conventionally provided with a horizontal panel configuration arranged above the material to be thermoformed) and this removal will be maximum towards the central region of the mentioned panel. Thus, the transmission of heat on the material will vary with the position of said material with respect to the surfaces of the ovens. Because of this reason, such a processing will require a power consumption which is much greater than that which would be required for plasticizing the material if the mentioned deformations would be absent, which would negatively affect the processing cost.

Prior heating ovens are moreover affected by a further drawback, which is related to the maintenance of the electric

2 systems therefor. In fact, the arrangement of the heating electric resistances on large size panels, requires performing the maintenance operations by sliding under the apparatus and, accordingly, in a very fatiguing position. Moreover, the great size of the heating panels will require the work of two maintenance operators, one operating on the rear of the machine for removing the contacts and fixing elements, and the other for supporting the electric resistances on the front of the oven.

With reference to the electric system of conventional oven apparatus, it should be moreover pointed out that the conventional horizontal opening of the heating panels has also the drawback that a very great length is required for the electric cables. The latter are actually of a type suitable to resist against high temperatures and, accordingly, they are scarcely flexible, with a further increasing of the manufacturing and maintenance cost of the system.

SUMMARY OF THE INVENTION

Accordingly, the aim of the present invention is to overcome the above mentioned drawbacks of the prior art.

Within the scope of the above mentioned aim, a main object of the present invention is to provide a heating oven system or arrangement, including heating panels suitable to provide the required safety conditions against any fire dangers.

A further object of the present invention is to provide such a heating system which has a much smaller size than that of prior like systems.

A further object of the present invention is to provide a good heat distribution through the plastic material, even in deflection conditions of a layered plastic material.

Yet another object of the present invention is to allow the electric system to be easily subjected to maintenance operations, while reducing the size and length of the electric cables.

The above and other objects are achieved by the oven according to the present invention, in particular for heating stations in thermoforming apparatus, of the type comprising a heating element assembly for heating a layer of a plastic material, and being essentially characterized in that said oven comprises a heating panel including two panel portions articulated at one of their outer edges and which can be mutually closed as a book or like a door, so as to provide said oven construction.

The invention also relates to heating stations provided with the mentioned ovens. In particular, the mentioned stations will comprise a counter-weight system adapted to provide a falling type of opening of the mentioned portions constituting the top panel, whereas the bottom panel is provided with a cradle configuration suitable to follow the deflection assumed by the layered plastic material as it is brought to its plasticizing temperature.

Owing to the disclosed feature of making each oven by combining two panel portions which can be mutually closed and can be opened in a book-like configuration, it will be possible to drive heating parts of smaller weight and size. Thus, in emergency condition, it will be possible to quickly remove the heating panels from the plastic material being processed, thereby preventing molten plastic material from falling on the ovens and thereby preventing any fire dangers from occurring. To that end, it would be significant to consider that, according to the invention, the first portion of the ovens which is driven away from the plastic material is the region at the center of the panels and, accordingly, that portion to which will correspond the greater deflection of the panels (i.e. that portion which is more susceptible to contact the plastic material).

Together with the increasing of the safety conditions, which can be assured owing to an opening through at least 90° of the half panels, the latter will also facilitate the maintenance operations on the panels, as opened through 180° with respect to their heating position. In such a condition, actually, the ovens will project outside from the framework of the apparatus, thereby freely presenting their surface to the maintenance operations.

To the foregoing it is to be added that two half-panels which can be opened like a book or a door will occupy a very reduced space (within the space limits of the conventional size of the apparatus), whereas the prior system will require a double occupied area.

Moreover, the manufacturing of the heating ovens as half-panels will afford the possibility of shaping as a "cradle" the bottom oven. Thus, the heating element can follow the deflection of the plastic material in a cross direction, thereby allowing the heating resistance to match the bell profile. Thus, it would be possible to reduce the power consumption by about 5%.

The construction of the ovens by two panel parts which can be separated from one another will allow a single operator to perform any maintenance operations, by simply removing the connecting elements from the rear of the apparatus and then disassembling the heating resistance from the front part of the apparatus, together with their parabolic supporting element. Because of that same reason, also the power supply cables can have a length much smaller than those which are necessary on conventional panels, with a further simplifying of the maintenance operations of the ovens and with a great reduction of their costs.

BRIEF DESCRIPTION OF THE DRAWINGS

Further characteristics and advantages of the present invention will become more apparent from the following detailed disclosure, with reference to the figures of the accompanying drawings which illustrate a preferred embodiment of the invention which has been shown exclusively by an exemplary and not limitative example. In the drawings:

FIG. 8 illustrates a block diagram showing the control of the driving systems via a read-out device.

DESCRIPTION OF THE PREFERRED EMBODIMENTS

Figure 1:
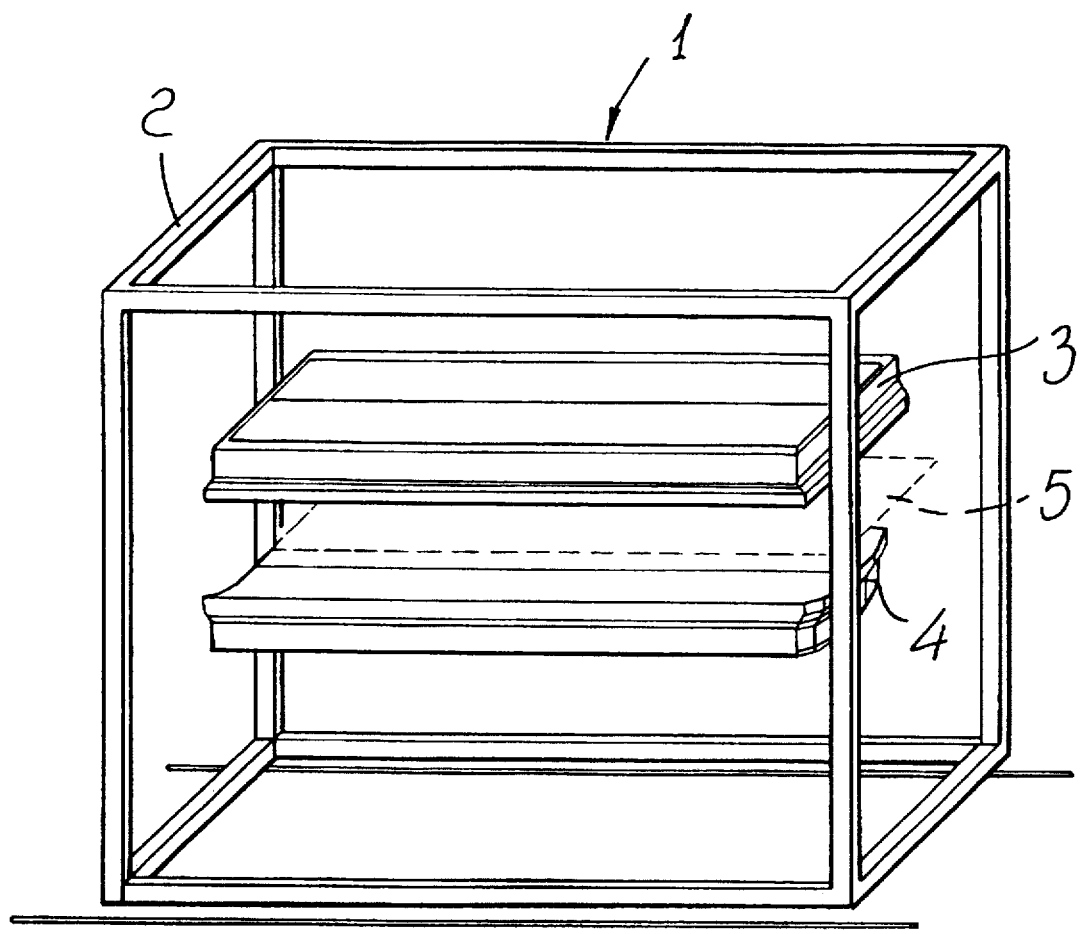
FIG. 1 is a perspective view illustrating a heating station provided with an oven system according to the present invention.

The heating station provided with ovens according to the present invention has been indicated by the reference number 1 in FIG. 1. This station comprises a framework 2, inside which are arranged the heating elements or panels constituting the heating ovens according to the invention.

These heating elements or panels are, in particular, formed by a top panel 3 and a bottom panel 4, therebetween is suspended a plate (or continuous film) 5 of the material to be thermoformed. As is better shown in FIG. 2, the top panel 3 has an essentially planar contour, whereas the bottom panel 4 has advantageously an arch or "cradle" configuration, suitable to follow the contour of the deflection 5a of the plate 5 during the plasticizing operation. However, it should be apparent that the shape of the panel 4 could also be a flat shape, like that of the top panel 3 or vice versa.

Figure 2:
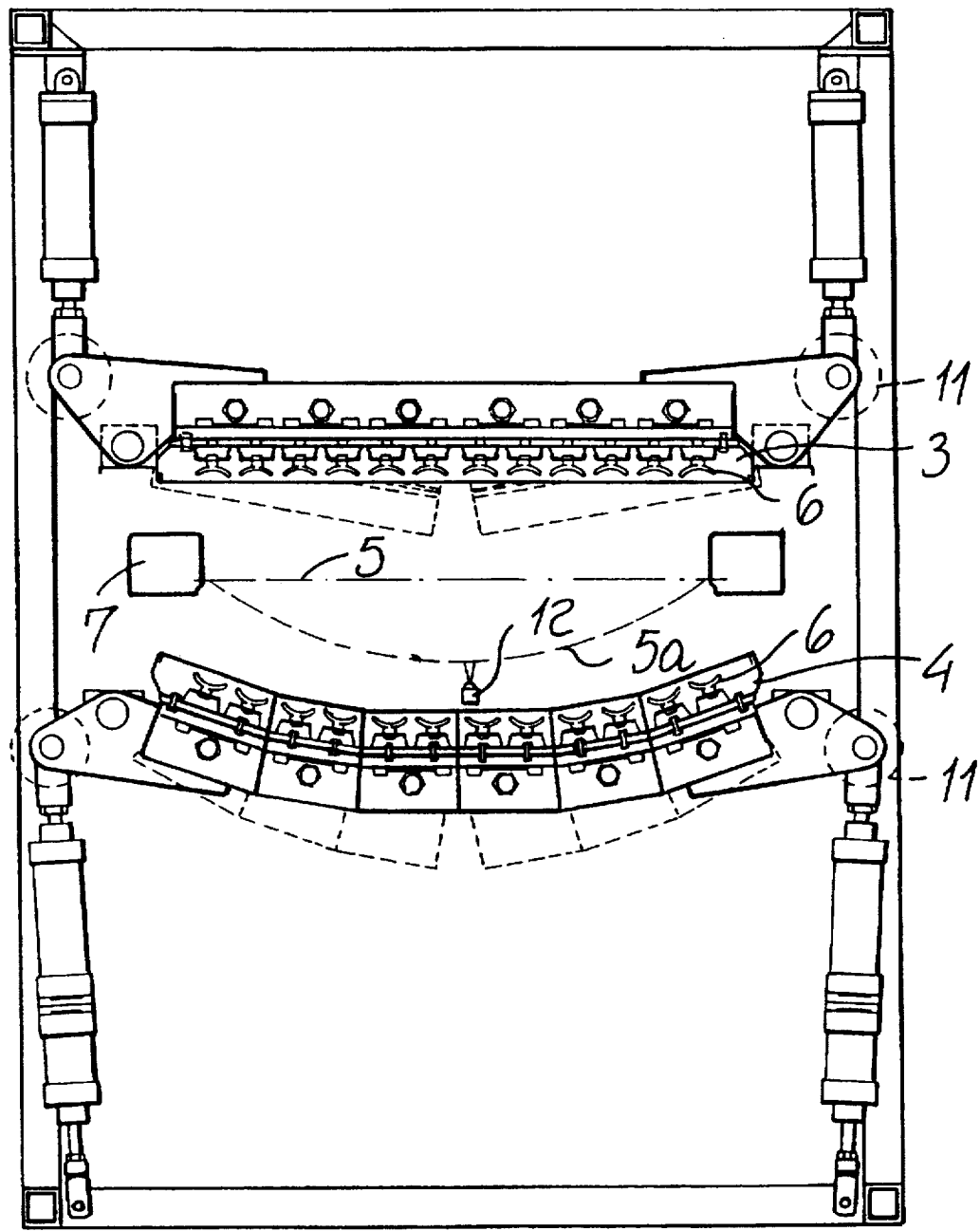
FIG. 2 illustrates the heating stations shown in FIG. 1, by a front view.
Figure 3:
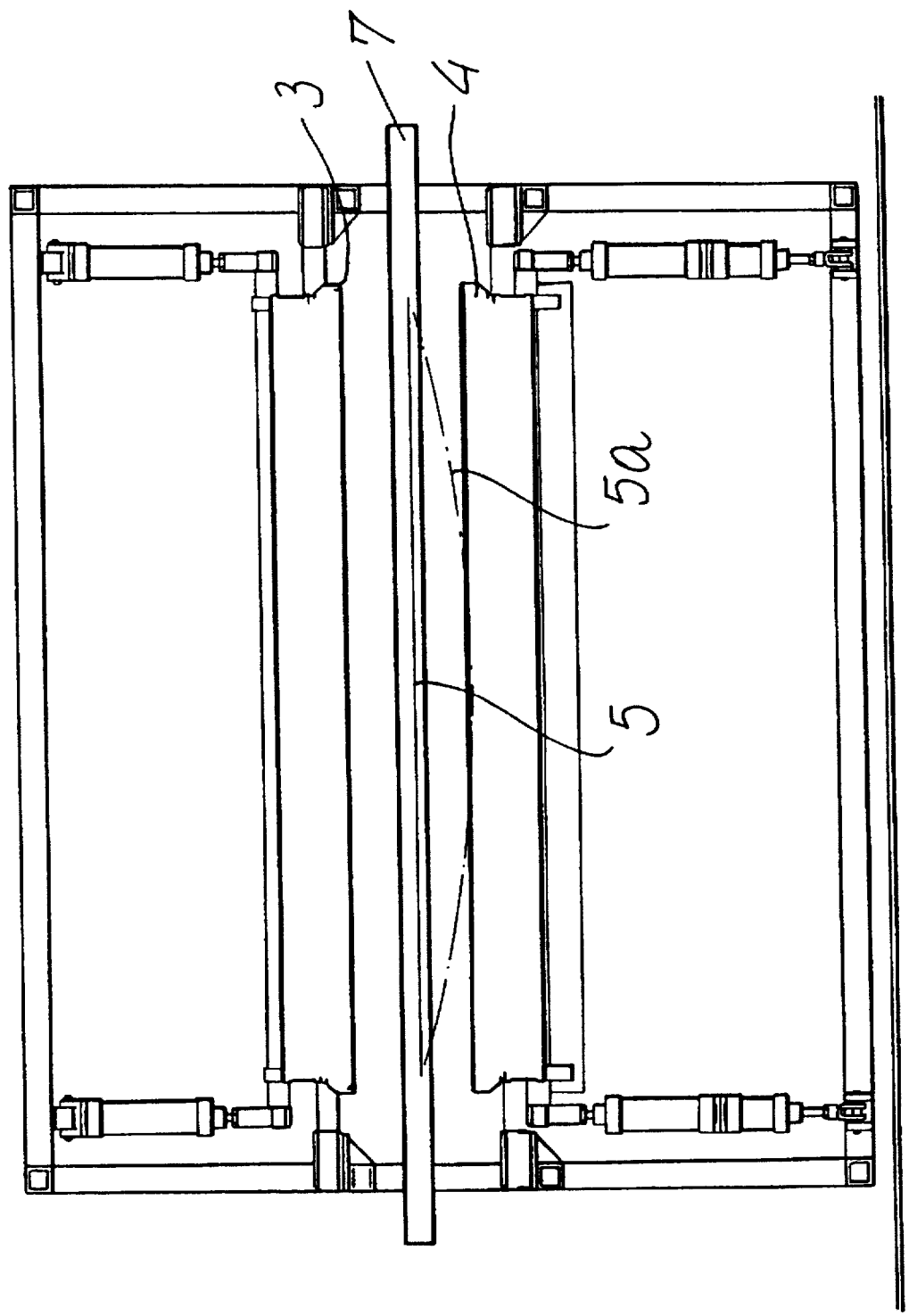
FIG. 3 is a side view illustrating the heating station shown in FIG. 1.
Figure 4:
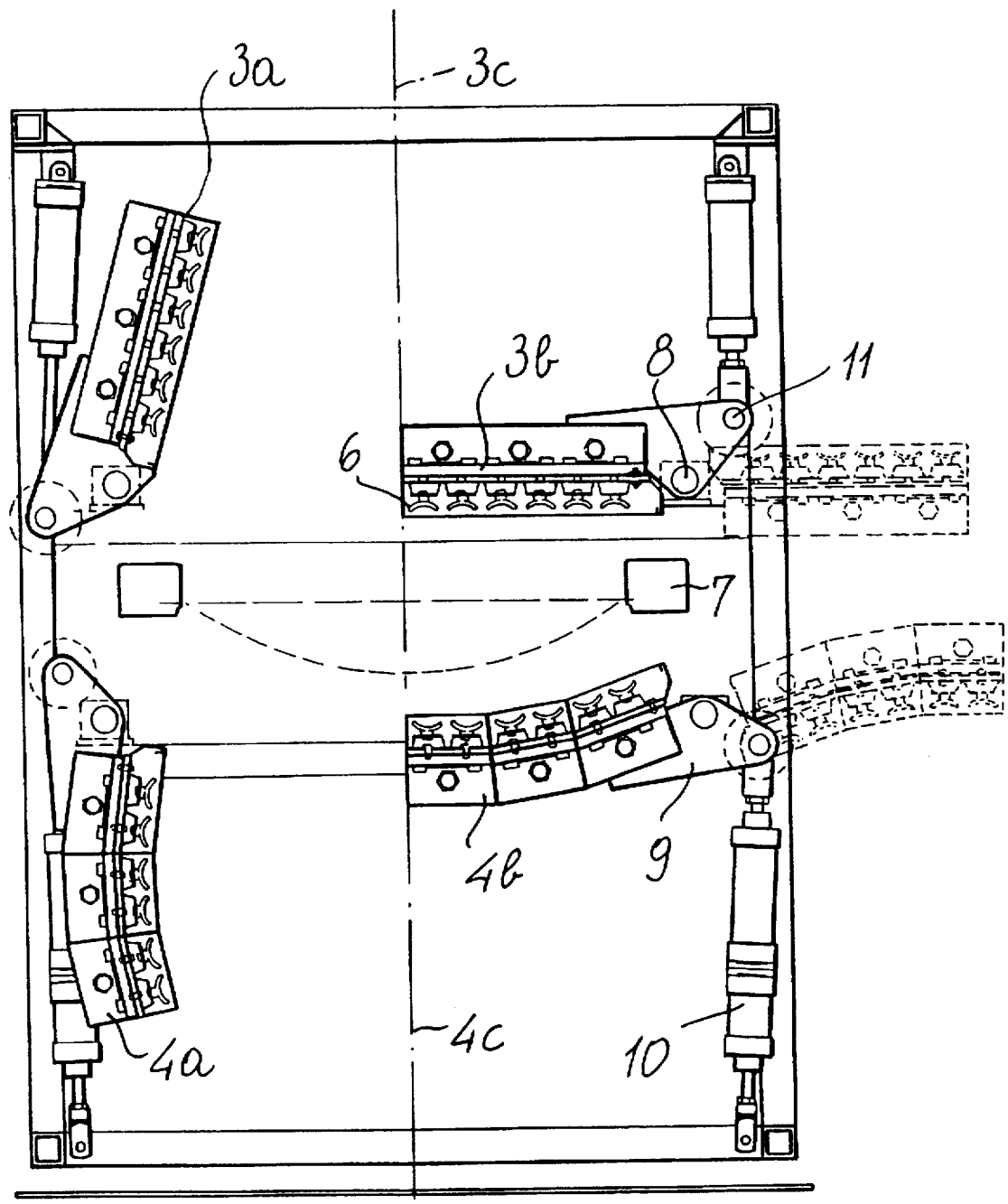
FIG. 4 is a further view of the station of FIG. 2 illustrating the different positions which can be assumed by the heating half-panels.

Each panel is in turn constituted by a plurality of electric resistances 6 of parabolic contour, facing the material 5 to be heated. These electric resistances are shown in FIGS. 2 and 4 which illustrate moreover the grippers 7 for holding or restraining the plastic material plate 5 at the edge portion thereof. The system comprises moreover an electric cable assembly for power supplying the above mentioned electric resistances 6, said assembly being not shown in the figures.

From an examination of FIG. 4 it should be apparent that each oven 3 and 4 is made by combining two panel portions (in the example two half-panels) respectively indicated by the reference number 3a, 3b and 4a, 4b articulated at one of their outer edge portions and which can be closed like a book or a wing door along the line 3c, 4c (the middle line in the shown embodiment) of the respective panel or oven 3 and 4. Each heating panel forming the oven according to the present invention has, accordingly, a construction constituted by two portions (having a like size in the shown embodiment) which are mutually opened and closed as the pages of a book, or as a two-wing door.

In order to provide an optimum distance between the plastic material sheet element to be heated and the ovens or panels 3 and 4, the station 1 is advantageously provided with a read-out device 12 (a photocell or a distance sensor or the like, see FIG. 2) for reading the mentioned distance. As shown in FIG. 8, this device is, in particular, adapted to control the above disclosed driving systems for driving the mentioned parts of the panels 3 and 4, so as to hold said panels near the material 5 in its flat configuration and so as to follow the deflection of the material as the latter begins to deform, thereby holding it at a constant distance from the heating panels. This read-out device 12 further controls the driving means 10 so that the oven is completely opened in the event of an over-heating (emergency conditions). In FIG. 2 by dashed lines has been shown one of the several positions which can be assumed by the parts constituting the panels 3 and 4.

Figure 6:
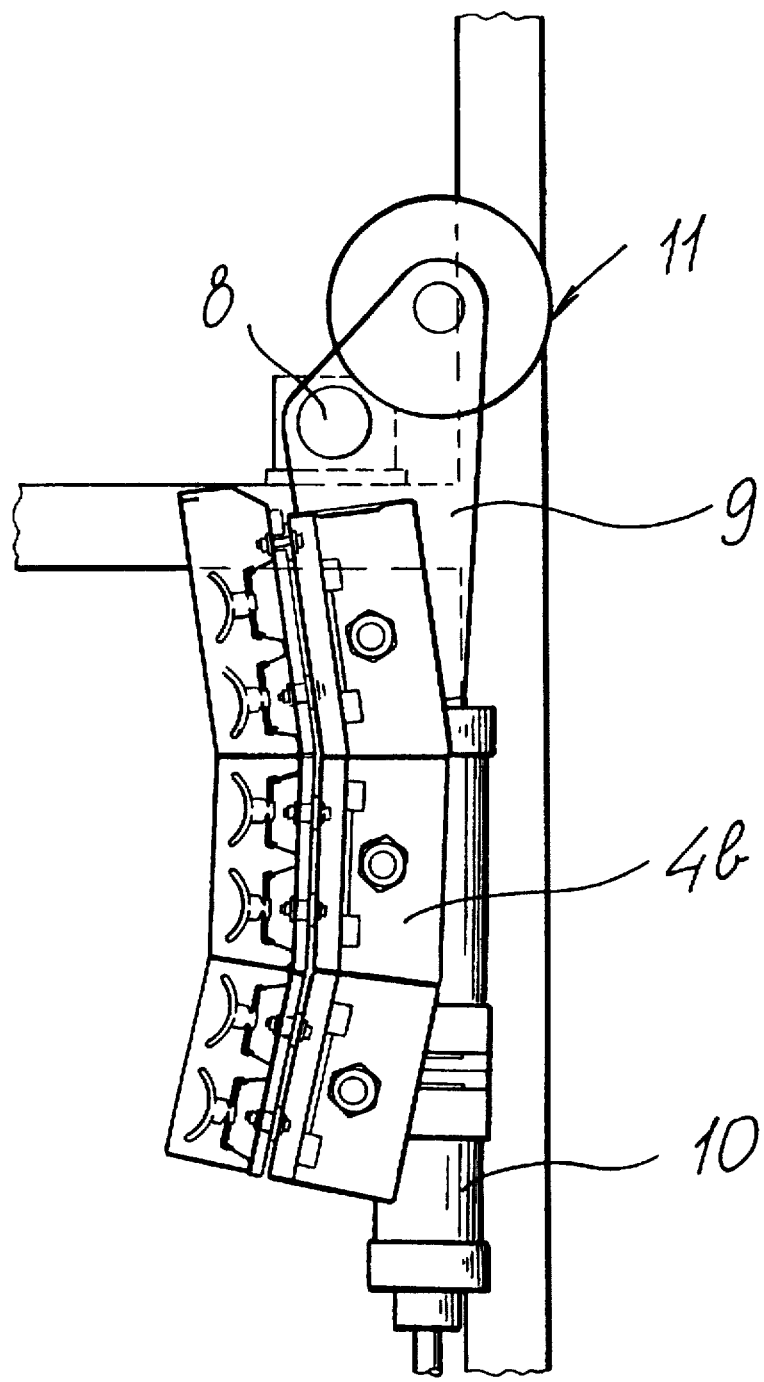
FIG. 6 illustrates a detail of the counter-weight opening systems provided for opening the bottom half-panels shown in FIG. 5.

FIGS. 4 and 6 illustrate the articulation or pivoting system of the panels 3 and 4. Each panel portion 3a, 3b and 4a, 4b is, as shown, articulated or pivoted on the pivot-pins 8 and through a lever or connecting rod 9 system, in turn driven by a pneumatic cylinder 10. The latter, which can be replaced by any other suitable driving means or the like devices, mainly operates to hold the panels 3 and 4 in their closed or operating position as shown in FIG. 2.

Figure 7:
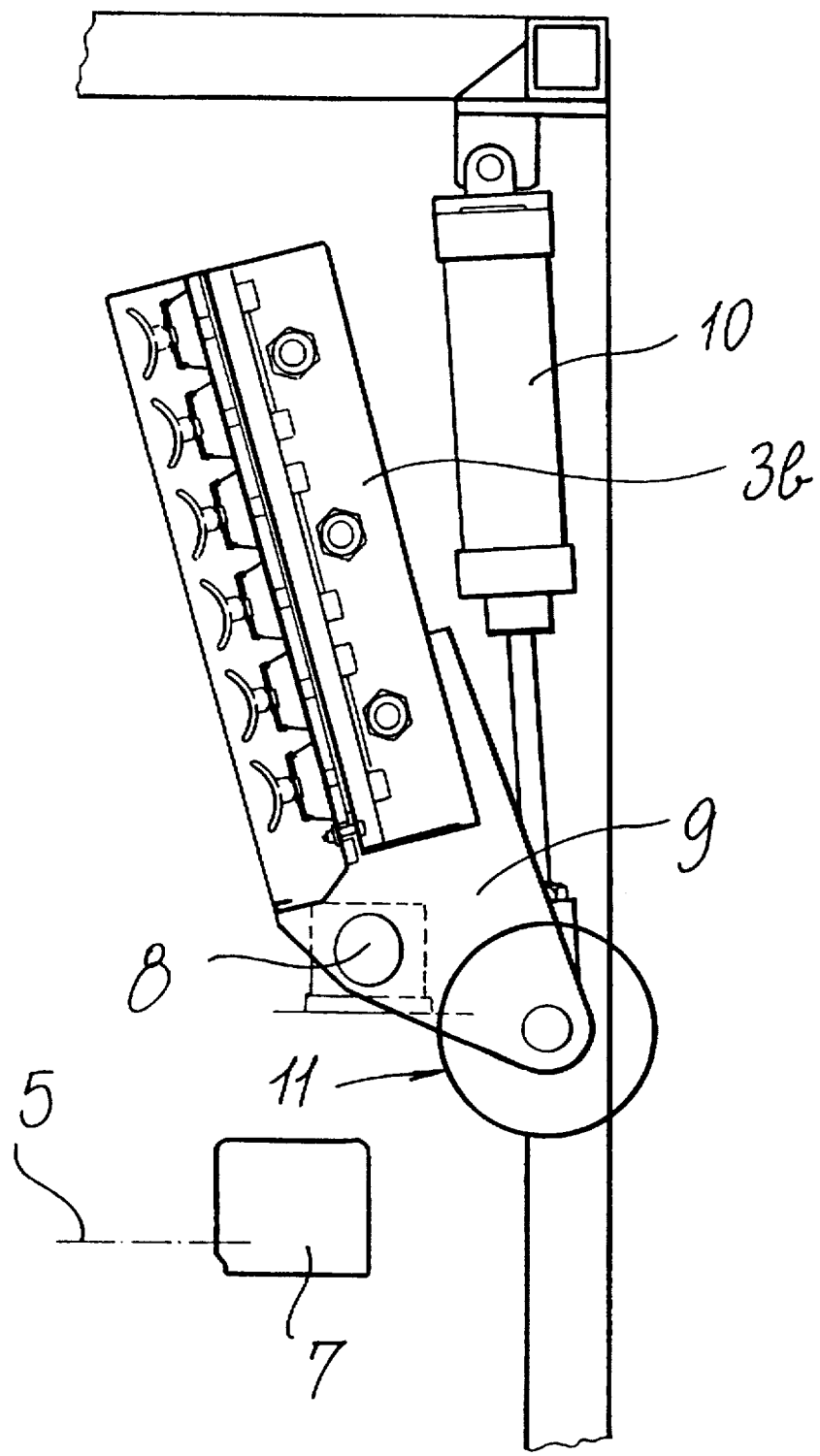
FIG. 7 illustrates a detail of the counter-weight opening systems for opening the top half-panels shown in FIG. 5.

The opening of the panels, on the contrary, is obtained, in addition to the above mentioned cylinders 10, also by the counter-weight system shown in FIGS. 6 and 7. This system essentially comprises block elements 11, mounted on the articulation assembly 9 at a position opposite to the above mentioned parts 3a, 3b and 4a, 4b of the panels 3 and 4 respectively. Under emergency conditions, the function of the mentioned counter-weights is that of assuring a perfect opening of the panels, even in a case of a malfunction of the driving systems therefor: for example because of an interruption of the power supply to their corresponding motors; or because of a malfunction in the air supply to the driving cylinders 10 (embodiment shown in the figures).

As is clearly shown in FIGS. 6 and 7, the counter-weights 11 are arranged at an opposite position with respect to the corresponding parts of the top panel 3a and 3b, and they will operate to immediately raise them in an emergency condition. To that end, the above mentioned counter-weights are so designed, or are provided with such lever arms, that they will provide a force greater than the weight force of the panel parts on which they will operate. A like arrangement of the counter-weights 11 is also provided on the bottom panel parts 4a and 4b. This time, however, since the mentioned panel parts will tend to open by a simple falling effect, the mass of the counter-weights 11 will be directed so as not to open the panel 4, but to close it, in order to control its falling movement and in order to prevent possible damages to the oven materials from occurring. Moreover, in the case of the bottom panel 4, the value of the counter-weight mass, or the size of the related lever arm, will be selected so as to provide a force less than the weight of the above mentioned panel parts 4a and 4b. In both cases, finally, the counter-weights 11 will operate to reduce the load which must be rotated by the driving assemblies 10.

Figure 5:
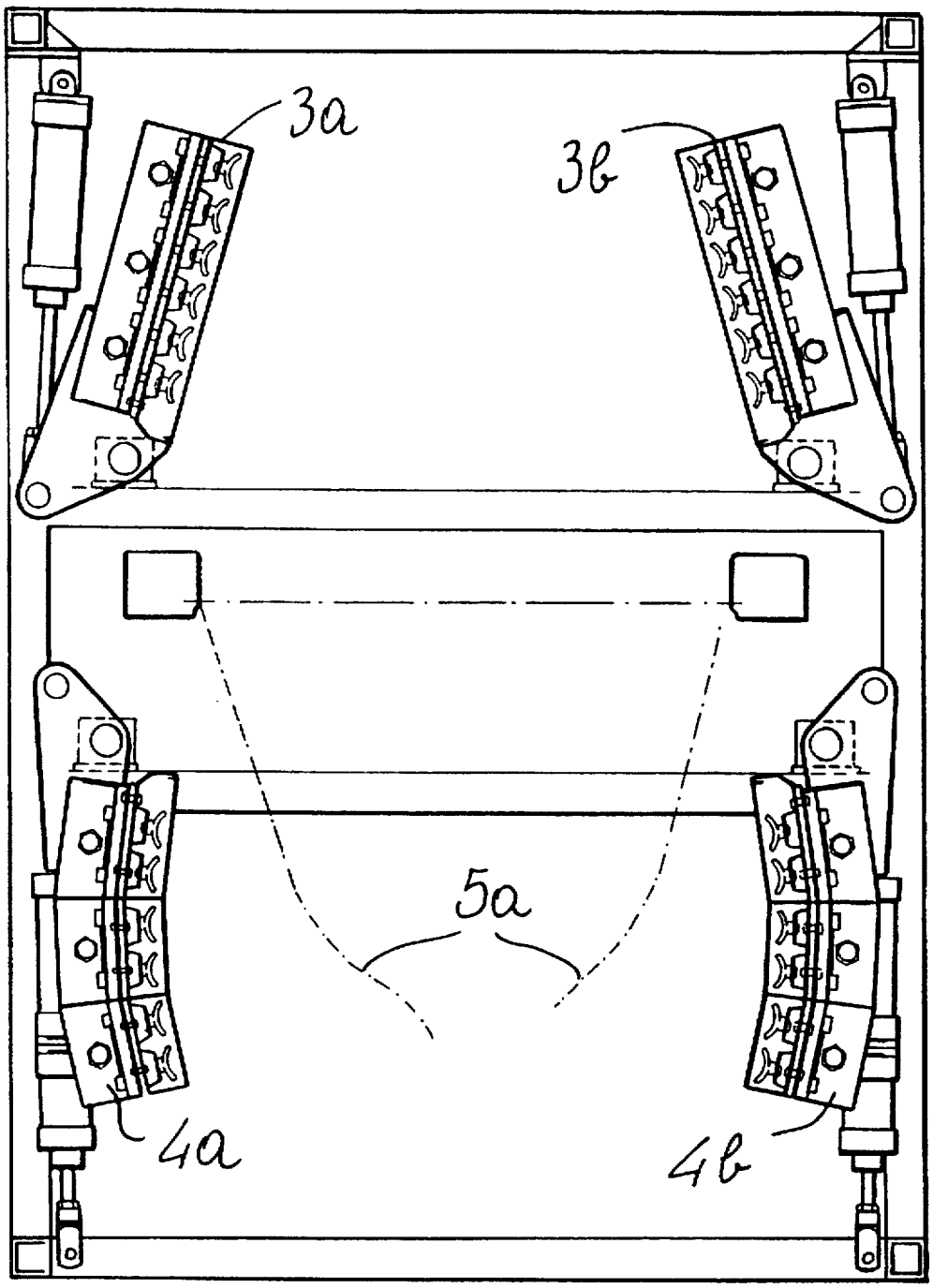
FIG. 5 illustrates the station of FIG. 2 with the heating half-panels in a quick opening emergency position thereof.

Owing to the above disclosed arrangement, the opening of the panels 3 and 4 and their mutual positions shown in FIG. 5 can be spontaneously performed by a falling effect (emergency conditions of the heating process).

The oven system which has been above disclosed operates as follows.

The heating step is started with the plastic material plate 5 held in a suspended condition between the panels 3 and 4, in the mutually closed position of the respective parts forming said panels (FIGS. 1 and 2). Upon achieving the plasticizing temperature, the plastic material will assume the deflected or belled configuration 5a shown in FIG. 2. As the plastic material deformation has achieved the desired degree (for example determined by a suitable optical read-out device or any other like device 12), the plate is caused to be driven outside of the heating region, for performing the heating process on a subsequent material plate.

In the case of an over-heating (emergency conditions), the system will detect an excessive level of the deflection 5a of the plate and will drive the operating cylinders 10 for opening the ovens 3 and 4. Thus, as is shown in FIG. 5, the parts 4a, 4b of the bottom panel 4 will downwardly fall so as to quickly move outside of the vertical projection of the plastic material 5. Thus, the latter, can not contact the ovens so as it can not be damaged by fire. By opposite movements, performed under the control of the cylinder 10 system and of the counter-weights shown in FIG. 6, the parts 3a, 3b of the panel 3 will be brought outside of the plastic material 5, thereby contributing to the cooling thereof and, accordingly, facilitating the stopping of the deflection 5a.

The above disclosed articulated connection of the panel parts constituting the ovens 3 and 4 will also allow said parts to be projected outside of the framework 2 of the station 1 (dashed lines shown in FIG. 4). In this position of the above mentioned panel parts, which is obtained by turning said parts through 180° starting from their closed or heating position (FIG. 2) it is possible to easily perform the necessary maintenance operations.

The disclosed and illustrated system can be subjected to any modifications and variations coming within the scope of the enclosed claims. As stated, the configuration of the panels 3 and 4 of the oven according to the present invention can be any, and different could also be the driving means for driving the panels as well as it would be also possible to provide different means for articulatedly connecting the panels to the framework of the heating station. Moreover, the individual parts 3a, 3b and 4a, 4b of the panel can have size different from those shown in the figures. Finally, it should be pointed out that, while a heating station including two ovens has been disclosed, within the scope of the present invention would come also heating stations provided with an individual oven (arranged either above or under the plastic material to be processed), as well as multiple stations.

I claim:

1. An oven, in particular for heating stations of thermoforming apparatus, of the type comprising an assembly of heating elements for heating a layer of a plastic material, characterized in that said oven comprises a heating panel including two panel parts arranged head to head adjacent to each other at an inner side of the heating panel, each of said panel parts being articulated at an outer edge portion thereof and adapted to move relative to each other to open and close said heating panel with respect to the inner side thereof.

2. An oven according to claim 1, characterized in that said oven comprises, at said outer edge portions of said panels, hinge elements (8) rotatively connecting said panel parts to a bearing framework (2).

3. An oven according to claim 2, characterized in that said oven comprises moreover a connecting rod or lever (9) assembly connecting said panel parts to said hinge elements (8).

4. An oven according to claim 3, characterized in that said oven comprises connected to said rod or lower pneumatic cylinders (10) for controlling the movements of said panel parts and holding said panel parts in a closed panel position.

5. An oven according to claim 1, characterized in that said panel parts are constituted by half panels and said inner side is a center line of said heating panel.

6. An oven according to claim 1, characterized in that said heating elements comprise electric resistances (6).

7. A heating station for thermoforming apparatus, of the type comprising at least one heating oven according to claim 1, for heating a layered plastic material (5), characterized in that said at least one oven comprises a heating panel according to claim 1.

8. A heating station according to claim 7, characterized in that said at least one oven (3, 4) comprises opening means for causing, in an emergency condition, said parts panel respectively (3a, 3b) and (4a, 4b) constituting said oven to open by falling.

9. A heating station according to claim 8, characterized in that said at least one oven comprises a panel (3) arranged over and spaced away from the top of the plastic material (5) to be heated, said opening means comprising counter-weights (11) adapted to provide a force greater than the weight of said panel parts (3a, 3b) and forming a first-class lever with said panel parts and a corresponding pivot-pin (8), so as to cause said panel parts to be opened, thereby removing the top oven from said material (5) under emergency conditions.

10. A heating station according to claim 8, characterized in that said at least one oven comprises a panel (4) arranged under and spaced away from said plastic material (5) to be heated, said opening means comprising counterweights (11) providing a force less than the weight of said panel parts (4a, 4b) and forming a first-class lever with said panel parts and a corresponding pivot-pin (8), so as to control the opening of said panel parts, thereby removing in a controlled manner the bottom oven from said material (5) under emergency conditions.

11. A heating station according to claim 8, characterized in that said heating station comprises two ovens (3) and (4) respectively arranged above and under and spaced away from the plastic material (5) to be heated.

12. A heating station according to claim 8, characterized in that said bottom panel (4) is provided with panel parts (4a, 4b) which are arranged head to head adjacent to each other at an inner side of said panel (4), each said panel part being articulated at an outer edge portion thereof and adapted to move relative to each other in order to provide a cradle contoured oven following the deflection (5a) assumed by said layered plastic material (5) as said material has achieved the plasticizing temperature thereof.

13. A heating station according to claim 8, characterized in that said heating station further comprises a read-out device (12) for reading the position of said at least one oven (3, 4) with respect to the material (5) and controlling said pneumatic cylinders (10) of said oven, said read-out device (12) controlling the displacement of said at least one oven so as to hold constant the distance of said at least one oven from said material (5) during the deformation of said material caused by the heating process.

* * * * *